W. B. JENKINS.
MOTOR VEHICLE SLEIGH.
APPLICATION FILED AUG. 7, 1919.
1,385,251.
Patented July 19, 1921.
4 SHEETS—SHEET 1.
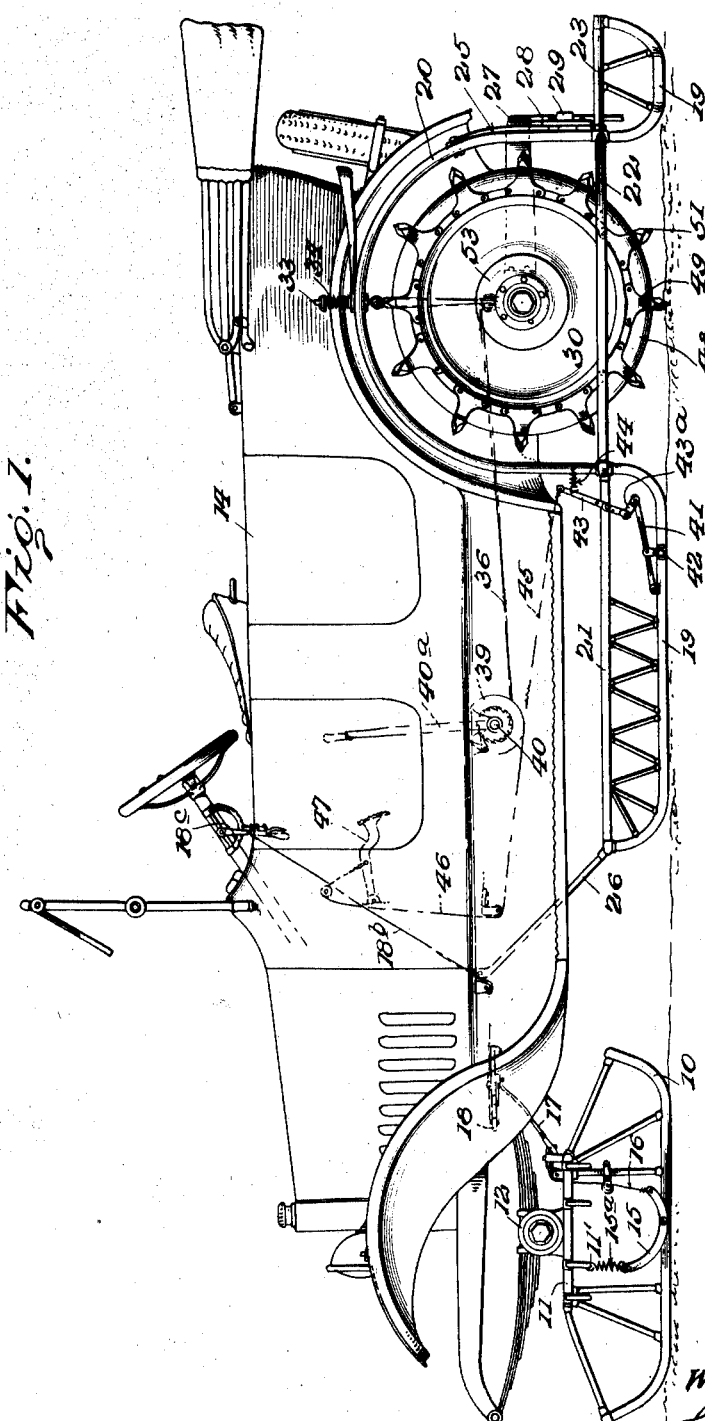
Inventor:
W. B. Jenkins.
by Lacey & Lacey,
his Atty's.

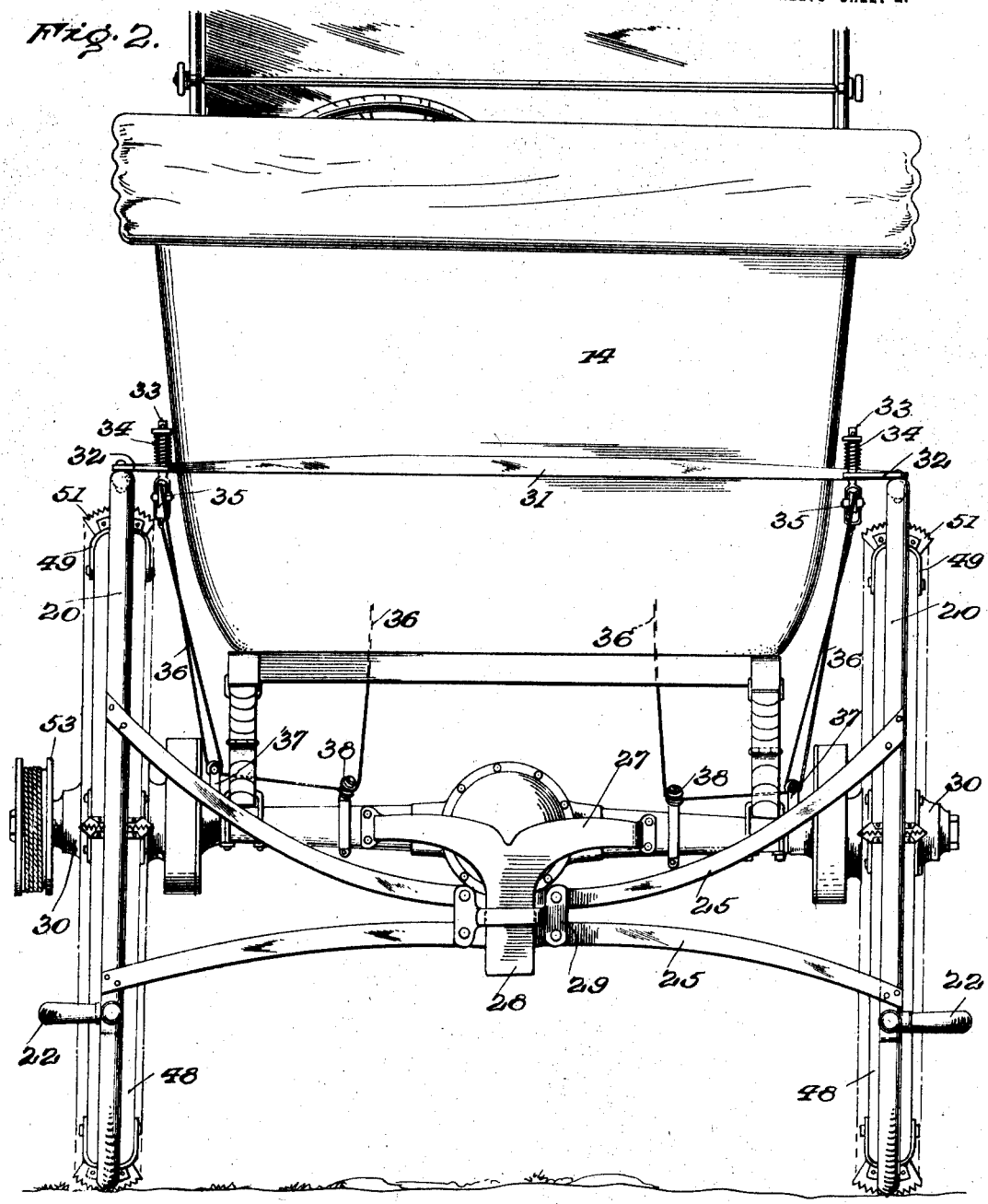

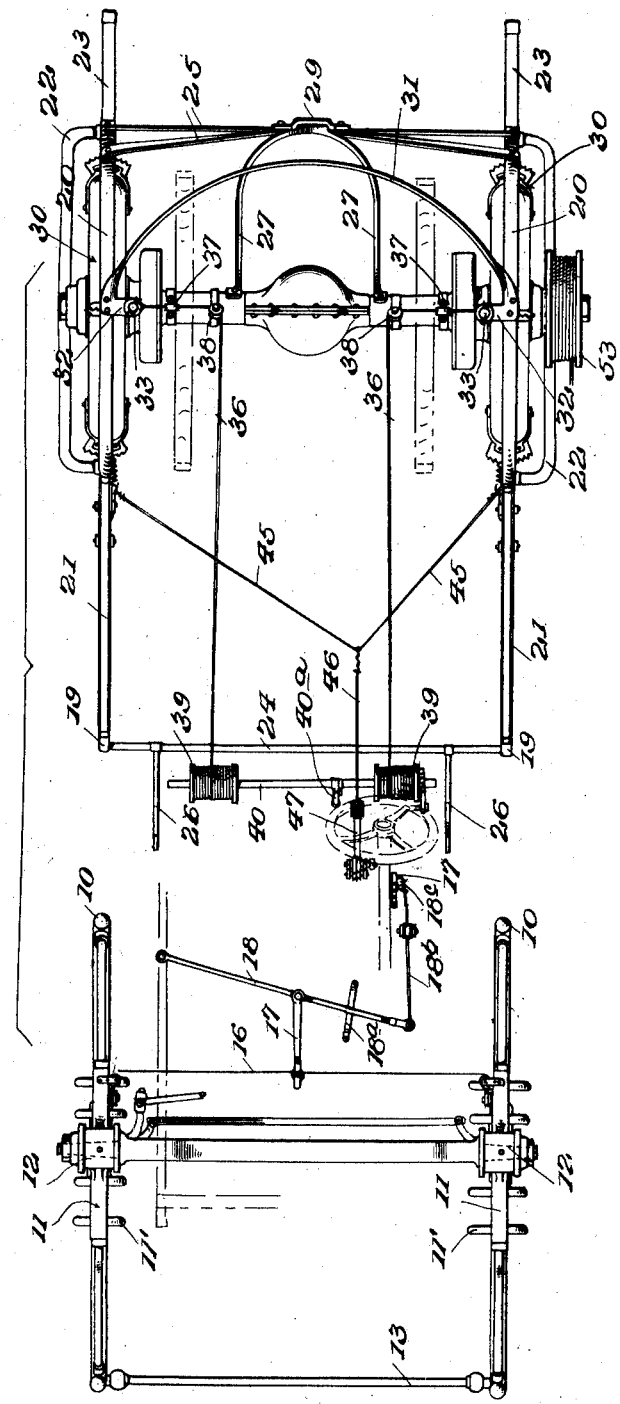

W. B. JENKINS.
MOTOR VEHICLE SLEIGH.
APPLICATION FILED AUG. 7, 1919.
1,385,251.
Patented July 19, 1921.
4 SHEETS—SHEET 4.
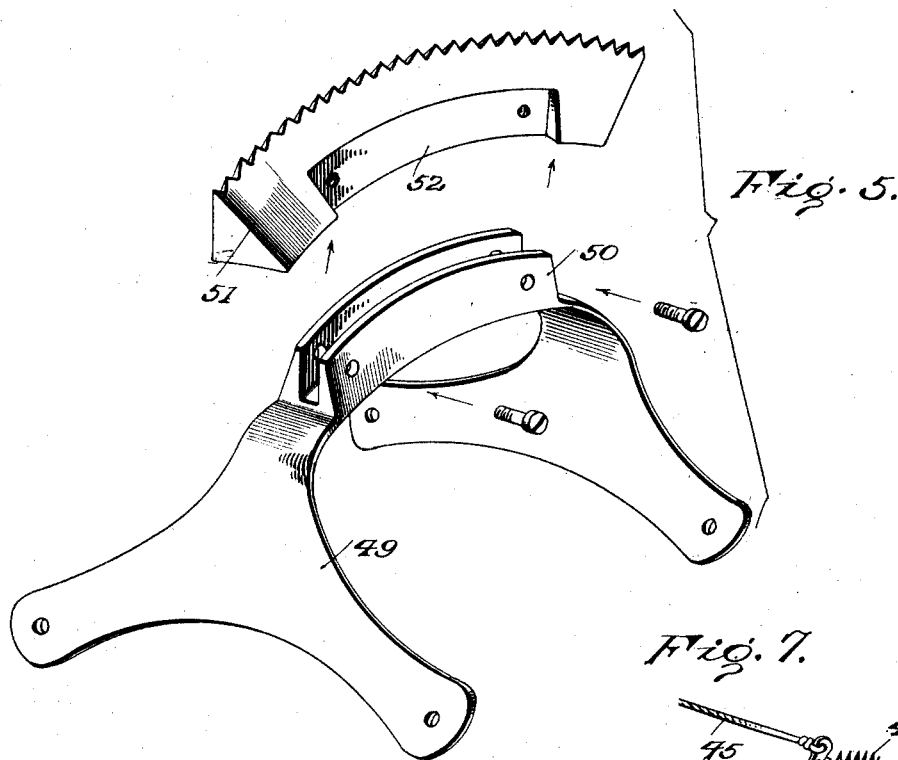
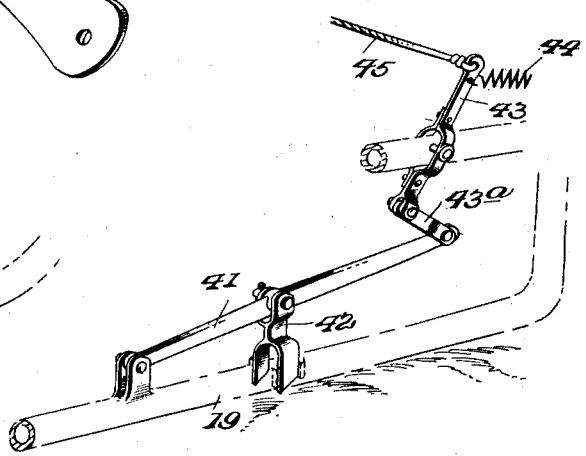
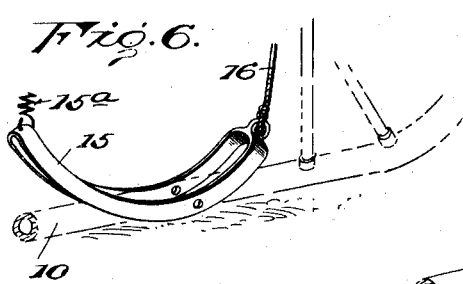
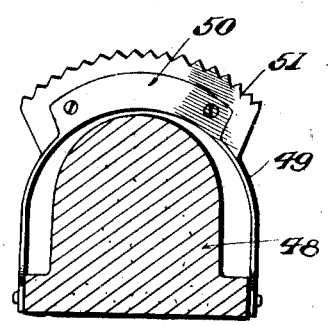
Inventor
W. B. Jenkins
by Larry & Larry,
his Attorneys.

UNITED STATES PATENT OFFICE.

WILLIAM B. JENKINS, OF BARBER, IDAHO.

MOTOR-VEHICLE SLEIGH.

1,385,251.     Specification of Letters Patent.     Patented July 19, 1921.

Application filed August 7, 1919. Serial No. 315,882.

*To all whom it may concern:*

Be it known that I, WILLIAM B. JENKINS, a citizen of the United States, residing at Barber, in the county of Ada and State of Idaho, have invented certain new and useful Improvements in Motor-Vehicle Sleighs, of which the following is a specification.

This invention relates to an improved sleigh and more particularly to a sleigh especially designed for use in connection with motor vehicles, the invention having as one of its principal objects to provide a construction whereby the sleigh may be attached to an ordinary motor vehicle for supporting the vehicle upon the runners of the sleigh when the sleigh may be driven by the motive power of the vehicle.

The invention has as a further object to provide a construction wherein the rear end portion of the vehicle may be adjustably elevated upon the sleigh for thus positioning the rear wheels of the vehicle with respect to the ground and wherein improved traction rims will be provided for the rear wheels of the vehicle so that the sleigh may be effectually driven thereby.

A still further object of the invention is to provide a construction wherein the rear end portion of the vehicle will be rigidly held against side movement but, at the same time, will be yieldably sustained upon the sleigh for thus enhancing the easy riding qualities of the vehicle when supported by the sleigh.

And the invention has as a still further object to provide means whereby the front runners of the sleigh may be prevented from skidding as well as means for braking the sleigh.

Other and incidental objects will appear hereinafter. In the drawings:

Figure 1 is a side elevation of my improved sleigh in connection with a conventional type of motor vehicle, Fig. 2 is a rear end elevation of the device, Fig. 3 is a plan view of the sleigh as it would appear when detached from the vehicle, Fig. 4 is a transverse sectional view taken through one of the traction rims provided for the rear wheels of the vehicle, Fig. 5 is a detail perspective view showing one of the traction elements carried by said rims and the bracket therefor, Fig. 6 is a fragmentary perspective view showing one of the anti-skid devices employed in connection with the front runners of the sleigh, and Fig. 7 is a fragmentary perspective view showing one of the brakes employed in connection with the rear runners of the sleigh.

Referring now more particularly to Figs. 1 to 3 of the drawings, I employ companion front runners 10. These runners may be formed of metal tubing or other approved material and rigidly mounted upon the upper longitudinal bars 11 of the runners are boxings 12. The bars 11 are supported by braces 11' engaging the struts of the runners and extending between the runners at their forward ends is a cross bar 13 bracing the runners with respect to each other. Preferably, ball and socket joints are employed adjacent the ends of this bar so as to permit proper flexing of the runners when guided. For convenience, I have shown my improved sleigh in connection with a conventional type of motor vehicle 14. As particularly illustrated in Fig. 1, the front wheels of the vehicle are removed and the front spindles are then engaged in the boxings 12. The front runners are thus operatively connected with the vehicle and are coupled to form a front truck which may be guided by the usual steering gear of the vehicle. Mounted upon the front runners 10 at points substantially midway of the ends thereof are anti-slipping devices 15. One of these devices is shown in detail in Fig. 6 and as there illustrated each of said devices comprises spaced arcuate blades having their convex edges presented downwardly and arranged to embrace one of the runners. Each device is pivotally mounted upon its runner by a bolt or other suitable fastening and is normally held in inactive position by a spring $15^a$. Extending between the rear ends of said devices is a cable 16 which is carried around suitable pulleys upon the runners and engaged with the intermediate portion of said cable is an arm 17 provided at its forward end with a yoke freely receiving the cable therethrough and carrying a pulley to coact with the cable. The arm is pivotally carried by a lever 18 pivoted at one end upon one of the side members of the chassis of the vehicle and supported at its free end portion by a suitably located bracket $18^a$. Engaged with the free end of said lever is a cable $18^b$ which is carried around a suitable pulley and is connected to a hand lever 18ᶜ mounted, as particularly shown in Fig. 1 of the drawings, upon the vehicle steering post and equipped with an approved latch to coöperate with a notched segment upon the post for locking the lever in adjusted position. As will be seen, the lever 18ᶜ may be readily operated for swinging the forward ends of the anti-slipping devices downwardly into engagement with the ground. The front runners may thus be prevented from skidding when the sleigh is passing over ice or is rounding a curve.

Supporting the rear end portion of the vehicle are companion rear runners 19. These runners, like the front runners, may be formed of metal tubing or other approved material and, intermediate of their ends, are directed upwardly to provide upstanding bows 20. Extending between the front end of each runner and the forward side portion of its bow is a brace bar 21. Alining with this bar is a laterally and outwardly offset brace bar 22 connecting the side portions of the bow of the runner and connecting the rear end of the runner with the rear side portion of its bow is a brace bar 23 alining with the brace bars 21 and 22. At their forward ends the runners are connected by a cross brace 24 and connecting the rear end portions of the runners are reversely curved cross braces 25 extending between the rear side portions of the bows 20. The rear runners are thus rigidly secured together to form a rear truck connected to the frame of the vehicle by coupling rods 26 engaged with the cross brace 24. Connecting the rear end portions of the runners with the rear axle of the vehicle is a coupling yoke 27. The side portions of this yoke are, at their free ends, detachably connected with the rear axle in any approved manner and formed on the yoke at its outer end is a depending arm 28 extending at the rear of the cross braces 25. Secured to these braces at a point substantially midway of the ends thereof is a keeper 29 which slidably receives the arm 28 therethrough. Thus, it will be seen that the rear runners will be rigidly held against longitudinal movement with respect to the vehicle while the arm 28 of the coupling yoke 27 will coact with the keeper 29 to prevent side movement of the rear end portion of the vehicle with respect to the runners. However, as will be clear, the rear end portion of the vehicle may be elevated with respect to the runners when the arm of the yoke will slide within the keeper.

It is now to be observed that the bows 20 are arranged to extend over the rear wheels 30 of the vehicle and for this reason the brace bars 22 are, as previously stated, offset outwardly so as to extend at the outer sides of the wheels. Connecting the bows 20 of the rear runners at their upper sides is a cross bow 31 extending around the rear end of the vehicle body and acting to brace the bows 20 with respect to each other. However, the cross bow 31 is preferably resilient so as to yield somewhat under stress upon the vertical bows. At its ends, the cross bow 31 is, as particularly shown in Fig. 3, formed with inwardly directed lateral arms 32 extending inwardly toward the vehicle body and slidable through these arms are plungers 33 supported by cushioning springs 34. At their lower ends, the plungers carry pulleys 35. Secured each at one end to the yokes of these pulleys respectively are cables 36 which are carried around pulleys 37 suitably connected to the end portions of the rear axle of the vehicle. The cables are then carried back up and around the pulleys 35 and are again brought down around the pulleys 37 when the cables are then carried beneath pulleys 38 suitably mounted upon the rear axle of the vehicle at opposite sides of the differential housing thereon. From the pulleys 38 the cables 36 are then carried forwardly beneath the vehicle and are connected to drums 39 upon a cross shaft 40 journaled upon the vehicle chassis, preferably in a plane slightly in advance of the driver's seat. A ratchet lever 40ᵃ which extends up into the vehicle body in front of the driver's seat is operable for rotating said shaft. Thus, the driver may, by actuating said lever, adjustably elevate the rear end portion of the vehicle upon the rear runners so that the rear wheels may be caused to clear the ground. In this connection, it will be observed that by carrying the cables 36 back and forth through the pulleys 35 and 37, the rear end portion of the vehicle may be raised with but slight effort. However, if desired, motive power may be employed for turning the shaft 40 to elevate the rear end of the vehicle. It is also to be observed in this connection, that by employing the plungers 33 and cushioning springs 34, the rear end portion of the vehicle will be yieldably sustained upon the rear runners for thus enhancing the easy riding qualities of the sleigh.

Mounted upon the forward portions of the rear runners are brakes for the sleigh. These brakes include brake rods 41 pivotally connected at their forward ends to the runners and swingingly mounted upon the intermediate portions of these rods are ground engaging forks 42 embracing the runners. Pivotally mounted upon the brace bars 21 of the runners are levers 43 to the lower ends of which are swingingly connected toggle links 43ᵃ pivotally engaged with the rear ends of the brake rods. Connected to the upper end portions of these levers are springs 44 acting to normally maintain the forks 42 elevated and extending from the upper terminals of the levers are cables 45. These cables are connected to a cable 46 which extends into the vehicle body and is, in turn, connected to a foot lever 47. As will thus be readily understood, the foot lever 47 may be depressed for rocking the levers 43 and consequently depressing the brake rods 41 to move the forks 42 downwardly into engagement with the ground for braking the sleigh.

Mounted upon the rear wheels of the vehicle are traction rims therefor. These rims may be secured in position upon the wheels in a manner similar to the ordinary demountable rim and each includes an annular rim body 48. This rim body may be formed of wood or metal and embracing the rim body at equally spaced points thereabout are transversely extending brackets 49. One of these brackets is shown in detail in Fig. 5 of the drawings. At their lower ends the brackets are formed with lateral lugs screwed or otherwise secured to the side margins of the rim body and upstanding from the intermediate portions of the brackets are spaced longitudinally curved flanges 50. Held by these flanges are longitudinally curved traction elements or calks 51. The calks are preferably wedge shaped in cross section and at their outer edges are provided with teeth to engage the ground. Formed in opposite sides of the calks are recesses 52 to snugly receive the flanges 50 and detachably connecting the calks with said flanges are screws or other suitable fastening devices extending through the flanges and the calks. The calks will thus be rigidly supported to extend transversely with respect to the rear wheels of the vehicle. As will now be understood in view of the previous description, the rear end portion of the vehicle may be adjustably elevated upon the rear runners of the sleigh so that the calks may be caused to properly engage the ground. Consequently, when the rear wheels of the vehicle are rotated by the motive power of the vehicle, the sleigh will be driven accordingly.

In connection with my improved sleigh, I preferably employ a winding drum 53 upon one of the rear wheels of the vehicle. This winding drum may be connected to the wheel in any approved manner and is designed to receive a cable so that should the sleigh for any reason become stalled, this cable may be connected to some stationary object, when by winding the cable onto the drum by the motive power of the vehicle, the sleigh may be extricated.

Having thus described the invention, what is claimed as new is:

1. The combination with a motor vehicle, of a front sleigh truck operatively connected with the front spindles of the vehicle, a rear sleigh truck, means connecting the forward end of the rear truck with the vehicle, means connecting the rear end of said rear truck with the rear end of the vehicle and holding the rear end of the vehicle against forward and rearward movement as well as transverse movement with respect to the rear truck but permitting vertical movement of the rear end portion of the vehicle with respect to the rear truck, and flexible suspension means supporting the rear end portion of the vehicle to hang from the rear truck.

2. The combination with a motor vehicle, of a front sleigh truck operatively connected with the front spindles of the vehicle, a rear sleigh truck including companion runners, means connecting the front end of the rear truck with the vehicle, cross braces extending between the runners at the rear end of the rear truck, a keeper carried by said braces, a bracket connected to the rear end of the vehicle and provided with a depending arm slidably engaged through said keeper for holding the rear end portion of the vehicle against forward and rearward movement as well as transverse movement with respect to the rear truck but permitting vertical movement of the rear end portion of the vehicle, and means for elevating the rear end portion of the vehicle upon the rear truck.

3. The combination with a motor vehicle, of a front sleigh truck operatively connected with the front spindles of the vehicle, a rear sleigh truck operatively connected with the rear end portion of the vehicle and including companion runners having their intermediate portions bent upwardly to define upstanding bows receiving the rear wheels of the vehicle, and flexible suspension means connected with said bows to depend therefrom supporting the rear end portion of the vehicle to hang from the rear truck.

4. The combination with a motor vehicle, of a front sleigh truck operatively connected with the front spindles of the vehicle, a rear sleigh truck operatively connected with the rear end portion of the vehicle, means for elevating the rear end portion of the vehicle upon the rear truck, and traction rims carried by the rear wheels of the vehicle, said rims each including a rim body, brackets straddling the rim body and secured thereto, and ground engaging calks carried by said brackets.

In testimony whereof I affix my signature.

WILLIAM B. JENKINS. [L. S.]